May 10, 1966 E. A. COIL ETAL 3,251,037

VARIABLE FIELD ADDRESSING SYSTEM

Filed Jan. 27, 1961 3 Sheets-Sheet 1

INVENTOR.
EMORY A. COIL
CARL M. LEKVEN

BY

ATTORNEY

United States Patent Office 3,251,037
Patented May 10, 1966

3,251,037
VARIABLE FIELD ADDRESSING SYSTEM

Emory A. Coil, Los Angeles, and Carl M. Lekven, Burbank, Calif., assignors to General Precision, Inc., a corporation of Delaware Filed Jan. 27, 1961, Ser. No. 85,223
3 Claims. (Cl. 340—172.5)

The present invention relates to electronic digital computers and it relates more particularly to an improved variable field addressing system for inclusion in a digital computer and which permits certain desired ones of a plurality of characters forming the words used in the computer to be selected for execution.

It is usual in digital computers, especially of the decimal type, to store the information to be used in the form of multi-character words. Each word may be composed of a plurality of characters; and each character, in turn, may be formed of a plurality of binary bits. In the particular computer to be described, for example, each word is composed of eight seven-bit characters.

In order to conserve storage space in the computer, it is usual for many of the multi-character words used therein to be made up of characters representative of unrelated items of information. In the prior art computers, desired characters are selected from such multi-character words by the use of masking commands. However, such masking commands require additional computer storage space. In addition, the use of masking commands requires additional computer steps which increase the required execution time for the various commands.

It is, accordingly, an object of the present invention to provide an improved variable field address control system for use in a digital computer, which system is capable of variable field operation by which desired characters for execution are selected from a multi-character word in the computer, this being achieved in a simple and straightforward manner without the need for additional masking commands or additional program steps.

Another object of the invention is to provide such an improved variable field computer control system which is capable of selecting desired characters from a selected multi-character word stored in the computer, and of achieving this in a relatively short time interval so that access time is reduced to a minimum.

Another object of the invention is to provide such an improved variable field computer control system which is capable of achieving such variable field operation without the need for additional masking commands or for corresponding additional storage space in the computer.

The features of the invention which are believed to be new are set forth in the claims. Other objects and advantages, however, will become apparent from a consideration of the following specification in conjunction with the accompanying drawing in which:

Figure 3:
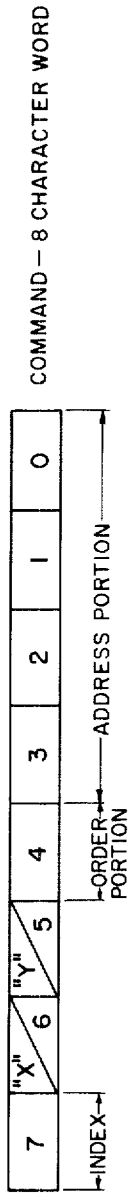
FIGURE 3 is a schematic representation of the composition of a typical eight character command word, as used in the particular computer to be described.
Figure 4:
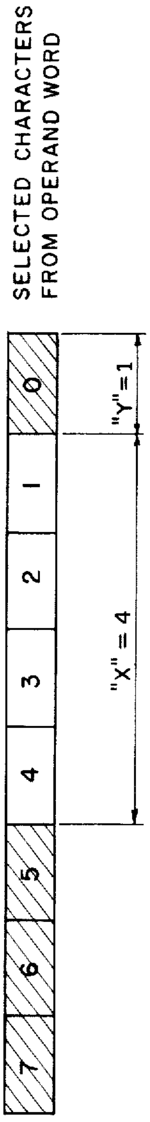
Figure 5:
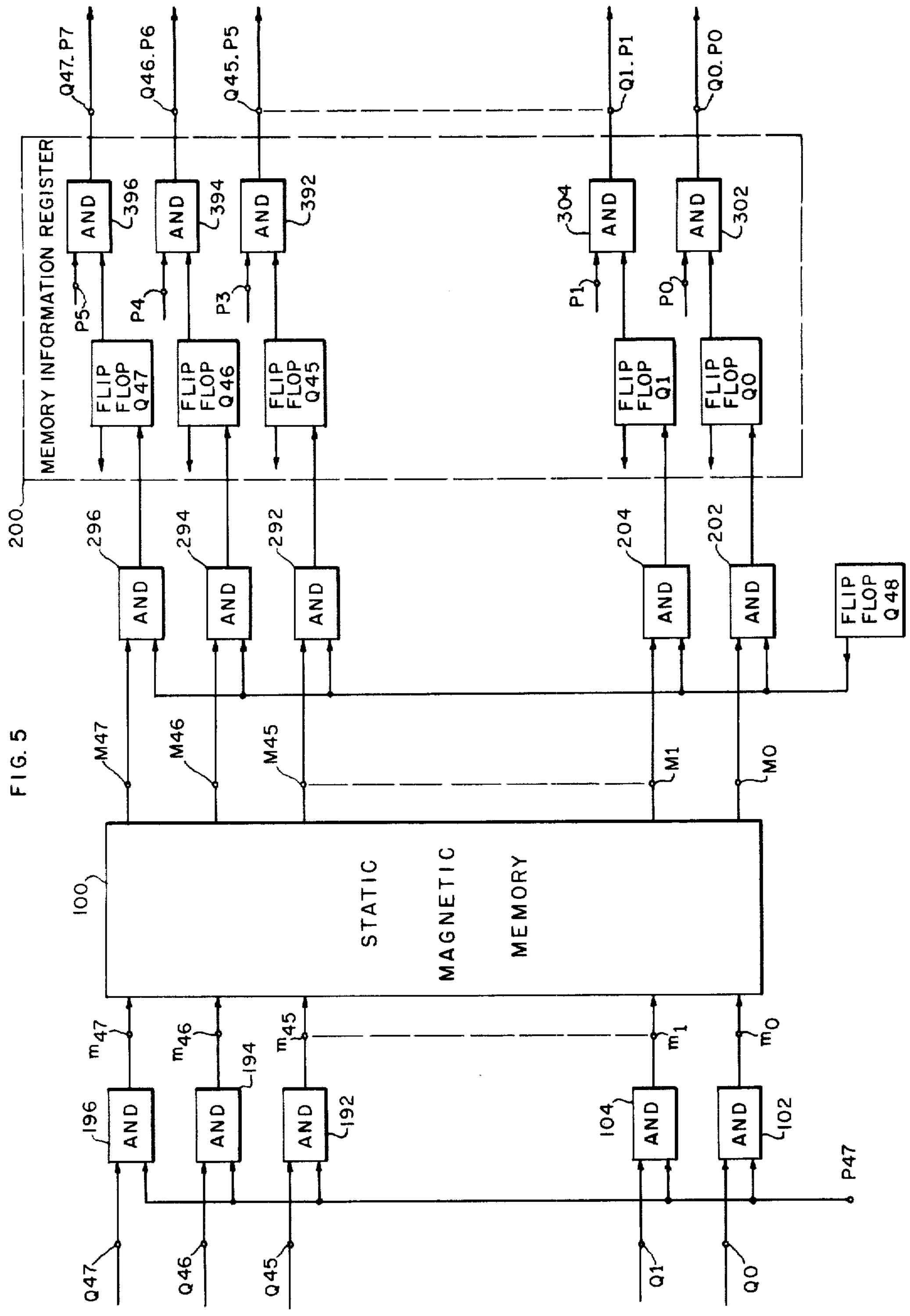
Figure 6:
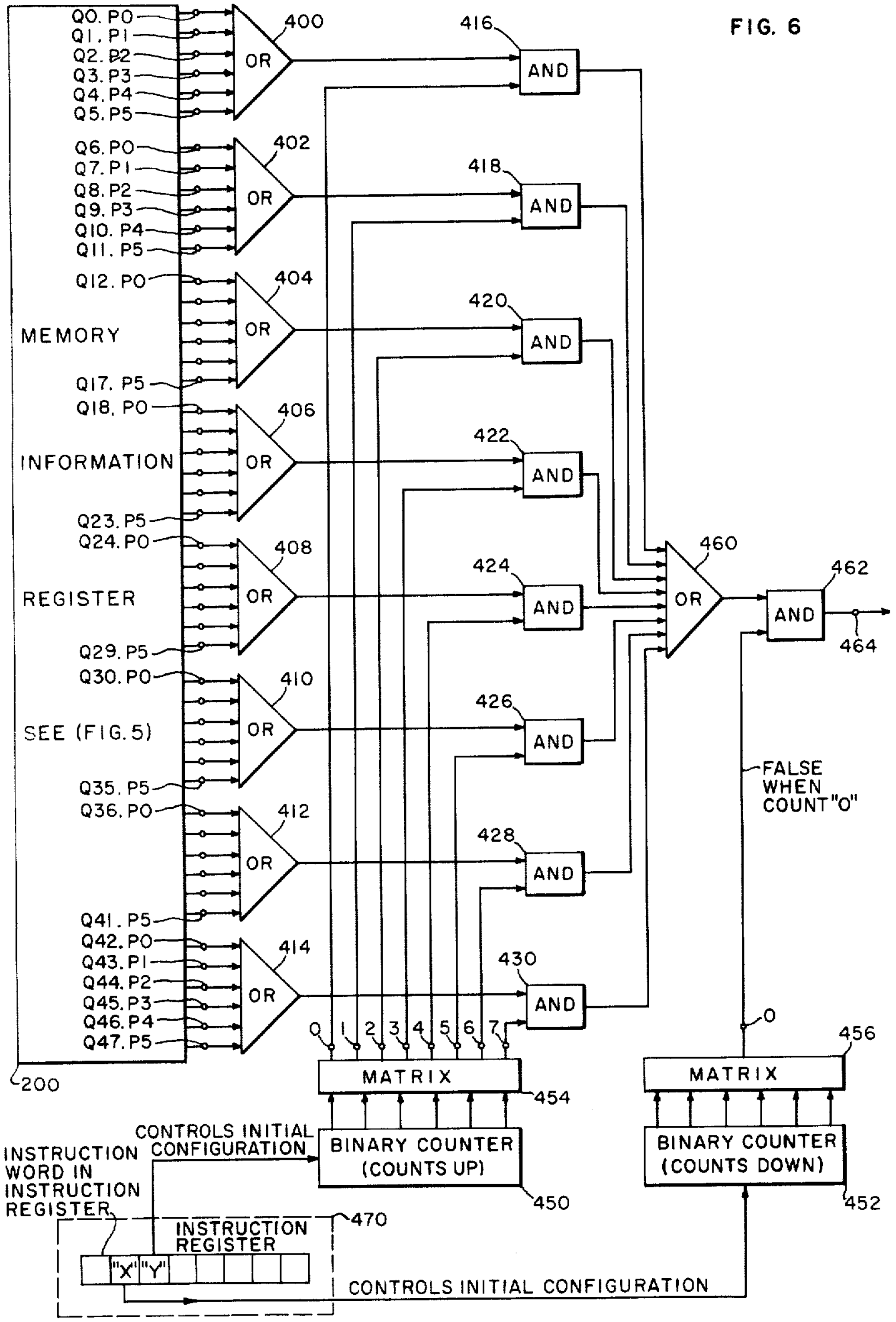

FIGURE 4 illustrated schematically the manner by which certain characters in the command word of FIGURE 3 designate in accordance with the invention, the characters to be utilized and executed from a selected operand word;

FIGURE 5 is a block diagram of a static memory system and associated logic circuitry and registers, which memory system may be used in the computer incorporating the variable field addressing system of the invention;

FIGURE 6 is a block diagram illustrating the logic circuitry and associated counters which may be used in practicing one embodiment of the variable field addressing system of the present invention.

Figure 1:
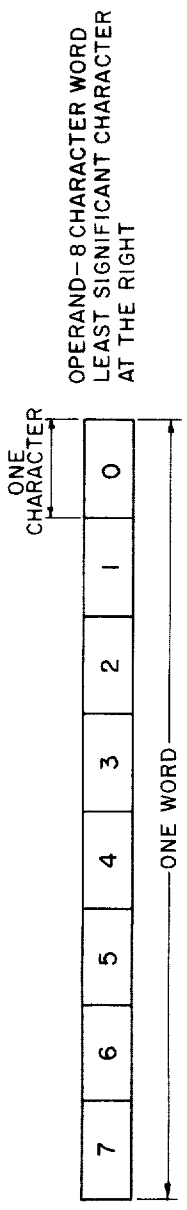
FIGURE 1 is a schematic representation of a multi-character operand word which is used in the particular computer system to be described.
Figure 2:
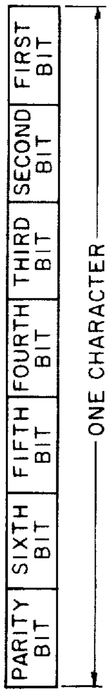
FIGURE 2 is a schematic representation of the binary bit composition of each character of the operand word of FIGURE 1.

As noted above, the particular digital computer system to be described utilizes eight character words, and each such character is composed of seven binary bits. As illustrated in FIGURE 1, for example, the multi-bit characters in each word are numbered from 0–7; and as illustrated in FIGURE 2, the binary bits forming each such character are numbered first, second, . . . etc., from the right. The least significant bit is at the right in FIGURE 2, and the parity bit is at the extreme left.

In accordance with the concepts of the present invention, and as shown in FIGURE 3, each command word in the computer system is also made up of eight seven-bit characters. The fifth and sixth characters, for example, in the command word of FIGURES 3 are used in the practice of the invention to designate the variable field information. As illustrated in FIGURE 3, the characters 0–3 represent the address portion of the command word. These characters may designate, for example, the address of the operand to be selected during the execution of the command, and they may also represent the address of the next command to be executed. The character 4 in FIGURE 3 represents the order portion of the command, and this character designates in the usual manner the operations to be performed on the selected operand. The character 7 in FIGURE 3 is an index character, and is used to select a particular index register in accordance with usual practice.

The fifth character of the command word, in FIGURE 3 designated "Y," is used to indicate the number of characters of the selected operand, from the right in FIGURE 3, which are not to be used during the execution of that particular command. In the operand illustrated in FIGURE 4, for example, the "Y" character in the corresponding command word of FIGURE 3 is assumed to be "1." This designates that the zero character of the operand word in FIGURE 4 is not to be used during the execution of the particular command.

The sixth character of the command word in FIGURE 3, designated "X" is used to indicate the number of wanted characters of the selected operand which are actually to be executed. In FIGURE 4, for example, the "X" character in the corresponding command word of FIGURE 3 is assumed to be "4." Under the direction of the command of FIGURE 3, only the characters 1, 2, 3, and 4 of the operand of FIGURE 4 are actually chosen for execution by the computer.

Therefore, in accordance with the concepts of the invention, certain characters of each command word in the computer under consideration are used to designate which characters of the selected operand are to be used for the operation designated by the order portion of the command. This precludes the necessity for using masking commands which entail additional storage space and which require additional access and execution time.

The information to be used in the computer under consideration may be stored, for example, in the memory system of FIGURE 5. The memory system may include a static memory 100. The magnetic memory 100 may be a magnetic core type, having 48 planes, for example. In a manner understood to the art, a particular core in each plane of the memory is selected by a memory address register (not shown) for a particular configuration of a plurality of flip-flops in that register. A different series of cores in the different planes is selected for each different configuration of these flip-flops in the memory address register. The flip-flops in the memory address register are set to the different configurations in accordance with the address portion of the different commands executed by the computer, and in well known manner. It will be appreciated that the above-described eight character operand and command words used in the computer are stored in the static magnetic memory 100, and that each bit of each individual word is stored in a different plane of the memory.

All the magnetic cores in each plane of the static magnetic memory 100 are linked, for example, by a single winding which is usually referred to as an "inhibit" winding. There is, therefore, a separate inhibit winding for each plane of the memory. The memory includes a plurality of input terminals $m_0$–$m_{47}$. These terminals are connected to corresponding ones of the inhibit windings in the different planes. The other terminals of the inhibit windings in the different planes may be connected to a suitable return lead, such as ground.

A plurality of "and" gates 102, 104, 192, 194, 196 are connected to respective ones of the input terminals $m_0$–$m_{47}$ of the static magnetic memory 100. A usual bit timing counter is included in the computer, and this counter functions in known manner to provide different series of bit timing pulses corresponding to the different bit times of each computer word time. These different bit timing pulses are usually designated as P0, P1, P2 . . . P47. The bit timing pulses P47, which correspond to the last bit time in each word time, are introduced to the "and" gate 102, 104 . . . 192, 194, 196.

The computer also includes a memory information register 200 which, in turn, includes a plurality of flip-flops Q0–Q47, a different flip-flop being provided for each bit of each word read into or out of the memory 100 through the memory information register. One of the output terminals of each of the flip-flops Q0–Q47 is connected to an input terminal of respective ones of the "and" gates 102, 104 . . . 192, 194, 196.

The computer under consideration also includes a read/record flip-flop Q48 which is controlled in known manner to assume a first stable state when a word is to be recorded into a designated position in the static memory 100; and to assume a second stable state when a word is to be read out of a designated position in the static memory. One of the output terminals of the flip-flop Q48 is connected to each of a plurality of "and" gates 202, 204 . . . 292, 294, 296. These "and" gates are connected to an input terminal of respective ones of the flip-flops Q0–Q47 in the memory information register 200.

Each of the memory cores in each plane of the static magnetic memory 100 is linked by a sensing winding, and the sensing windings of the different planes are connected to the respective output terminals M0–M47. These output terminals, as shown in FIGURE 5, are connected to respective ones of the "and" gates 202, 204 . . . 292, 294, 296.

The readout of a selected word from the static magnetic memory 100 of FIGURE 5 occurs at P46 bit time. For this purpose, and in known manner, the P46 bit timing pulse in a selected word time causes a readout to occur of the selected core in each of the memory planes. Such a readout results in a pulse in the sensing winding linking the cores in each plane, with the corresponding pulses from each plane appearing at the different output terminals M0–M47. However, an output pulse occurs at P46 bit time at the corresponding one of the output terminals M0–M47 only if a "1" is stored in the selected core in the corresponding plane. If a "zero" has previously been recorded in the selected core in the corresponding plane, the core remains in its zero state, and no pulse appears at the output terminal.

The net result is that the selected core in each memory plane of the magnetic memory 100 is set to "zero" during the readout, the pulses appear at the different output terminals M0–M47 representative of whether a "1" was recorded at the corresponding bit position of the word read out of the memory. During this readout operation, the core in each memory plane of the static memory 100 corresponding to the different bits of the word read out of the memory are all set to zero.

As noted above, during the readout operation at P20 bit time the resulting pulses appear at different ones of the output terminals M0–M47. These pulses are passed to respective ones of the flip-flops Q0–Q47 in the memory information register, and they serve to set these flip-flops accordingly. However, the information is passed to the flip-flops Q0–Q47 in the memory information register 200 only if the read/record flip-flop Q48 is set to a stable state representative of a "read" operation. When the flip-flop Q48 is in its other stable state, on the other hand, the information in the selected cores of the different memory planes of the memory 100 is lost during the readout operation at P46 bit time, and these cores are all cleared to zero.

For a read-in operation, by which a computer word is to be recorded into a selected position in the static magnetic memory 100, the "and" gate 102, 104 . . . 192, 194 and 196 are enabled at P47 bit time. This permits the contents of the flip-flops Q0–Q47 in the memory information register 200 to be transferred to the previously cleared selected memory cores in the different memory planes of the memory 100. This previous clearing of the selected memory cores of the memory 100 occurs at P46 bit time (as described above) and the information previously set in these cores is lost because the flip-flop Q48 is now set at its read-in stable state.

The output of the "and" gates 102, 104 . . . 192, 194 and 196 are introduced to the respective inhibit windings of the different memory planes, which, as noted above, are connected to the input terminals $m_0$–$m_{47}$.

In the manner described briefly above, and as is well understood to the art, information is read out of the static memory 100 at P46 bit time in a selected word time by selecting a particular core in each plane of the memory by the memory address register (not shown), and by setting the flip-flop Q48 to a state such that the information read out of the different cores may be set into the flip-flops Q0–Q47 in the memory information register 200. To read a word into the memory 100, on the other hand, the flip-flop Q48 is set to its "record" stable state. Then, the selected cores in the different memory planes are pulsed at P46 bit time of a selected word time and thereby set to zero. The information previously being recorded in those cores is lost during this operation because the "and" gates 202, 204, 206 . . . 246 are now disabled. Then, the word to be read into the cores of the magnetic memory 100, which word is now in the memory information register 200, is fed into the cores of the memory through the "and" gates 102, 104 . . . 192, 194, 196 at the following bit time. It is clear, therefore, that the memory information register 200 receives each word read out of the static memory 100, and this register also receives each word to be read into the static memory 100.

The variable field addressing system of the present invention enables certain designated characters only of any selected word in the memory information register 200, to be executed and used by the computer. This is achieved in a manner now to be described.

As illustrated in FIGURE 5, one of the output terminals of each of the flip-flops Q0–Q47 in the memory information register is connected to respective ones of a plurality of "and" gates 302, 304 . . . 392, 394 and 396. These "and" gates are divided in groups, with a group corresponding to each character of the information in the memory information register. The bit timing pulses P0–P5 are successively applied to the "and" gates in each group. That is, the bit timing pulses P0 are applied to the "and" gate 302, the bit timing pulses P1 are applied to the "and" gate 304 . . . the bit timing pulses P3 are applied to the "and" gate 392, the bit timing pulses P4 are applied to the "and" gate 394, and the bit timing pulses P5 are applied to the "and" gate 396.

Therefore, a plurality of groups of signals representative of the different characters of the information in the memory information register 200 appear simultaneously at the output terminals of the "and" gate 302, 304 . . . 392, 394 and 396; and the signals in each group appear successively at P0–P5 bit times. These output signals are applied to a plurality of "or" gates 400, 402, 404, 406, 408, 410, 412 and 414 in the circuitry of FIGURE 6.

It will be remembered that each computer word is assumed to be composed of eight six-bit characters in the computer under consideration. The signals corresponding to the binary bits which make up each of the different characters of the word in the memory information register 200 are applied to different ones of the "or" gates listed above at P0–P5 bit times. The arrangement is such, for example, that the binary bits of the first character of the word in the memory information register are successively introduced at P0–P5 bit times to the "or" gate 402, and so on. The "or" gates 400, 402, 404, 406, 408, 410, 412 and 414 are respectively connected to a plurality of "and" gates 416, 418, 420, 422, 424, 426, 428 and 430.

The variable field computer control system of the present invention includes a first counter 450 and a second counter 452. Each of these counters may be a usual binary counter, the counter 450 being connected to count up and the counter 452 being connected to count down. The counters 450 and 452 contain sufficient flip-flops so that each may exhibit at least seven different configurations. A matrix 454 is connected to the counter 450, and a matrix 456 is connected to the counter 452. These matrices may be of usual configuration to develop output signals at their different output terminals in response to the different configurations of the associated counters.

The matrix 454, has a plurality of output terminals labeled "0–7," and these output terminals are connected to respective ones of the "and" gates 416, 418, 420, 422, 424, 426, 428 and 430. The output terminals 0–7 of the matrix 454 enable the respective "and" gates 416, 418, 420, 422, 424, 426, 428 and 430, as the counter 450 successively assumes its different configurations.

The "and" gates referred to above are all connected to an "or" gate 460, and this "or" gate is connected to an "and" gate 462. The "and" gate 462 is connected to an output terminal 464 at which the selected field, composed of the selected characters, of the selected computer word, appears in serial form for application to the utilization networks of the computer. The matrix 456 includes an output terminal labeled "0," and this output terminal develops an output signal to disable the "and" gate 462, when the count of the binary counter 452 reaches zero.

During the operation of the control system of FIGURE 6, the corresponding command word is in the instruction register 470 of the computer. This register may have any known form, and it may, for example, include a plurality of flip-flops. A first group of the flip-flops in the instruction register 470 assumes a configuration corresponding to the code designated by the "Y" character of the command word in the instruction register. A second group of flip-flops in the instruction register assumes a different configuration corresponding to the code designated by "X" character of the command word. The counter 450 includes usual logic circuitry (not shown) which responds to the settings of the "Y" flip-flops in the instruction register 470 to set the initial configuration of the counter 450. Likewise, the counter 452 includes usual logic circuitry (not shown) which responds to the settings of the "X" flip-flops in the instruction register 470 to set the initial configuration of the counter 452.

After the counters 450 and 452 have been set to their initial configuration in a particular word time, they are caused to step each succeeding character time from one configuration to the next. This stepping continues until the counter 450 counts up to "seven," as indicated by signal on the output terminal "7" of the matrix 454, which enables the "and" gate 430. The count of the counter 452 continues until it reaches zero, as evidenced by signal at the output terminal "0" of the matrix 456, which disables the "and" gate 462.

Therefore, the command word in the instruction register 470 determines first by its "Y" character the initial configuration of the counter 450, which, in turn determines the first character of the operand word in the memory information register 200 which is to be serially read through the "or" gate 460 and through the "and" gate 462 to the output terminal 464. When the "Y" is a "1," for example, as in the command word of FIGURE 4, the initial configuration of the counter 450 is such that the "and" gate 416 remains disabled, and the first character of the word in the memory information register to be read serially to the output terminal 464 is the character 1, as read serially through the "or" gate 402 and through the "and" gate 418. The reading of the word in the memory information register 200 now continues serially at the output terminal 464 through the "and" gates 418, 420, 422, 424, 426, 428 and 430, as these "and" gates become successively enabled by the counter 450 and its matrix 454.

Assume now that, as in the command word of FIGURE 4, the "X" character is a "4" then, the initial setting of the counter 452 will be such, that the counter will have counted to zero at the end of the passage to the output terminal of the fourth character in the corresponding operand word in the memory information register 200, so that the remaining three characters of that word, although passed through the "and" gate 426, 428 and 430, do not pass to the output terminal 464, because the "and" gate 462 is now disabled. In this manner, only the selected characters of the word in the memory information register 200 are passed to the output terminal 464. It is evident that the characters of the operand word in the memory information register 200 to be so passed to the output terminal 464 may be chosen at will, merely by establishing a desired code in the "X" and "Y" characters of the corresponding command word in the instruction register 470.

As noted above, the counters 450 and 452 may be usualy binary counters and are well known to the art. The matrix 454 and the matrix 452 may be of a diode or other known type of matrix. Counters and matrices of the general type are described, for example, in a textbook entitled "Analog-Digital Conversion Techniques" edited by Alfred K. Susskind, published in 1957 by the Technology Press of the Massachusetts Institute of Technology. Suitable logic circuitry and components for controlling the initial configuration of the counters 450 and 452, under the control of the configuration of flip-flops in the instruction register 470, are also well known and need not be described in detail here.

The invention provides, therefore, an improved variable field addressing system for inclusion in a digital computer. In practicing the present invention, each command word in the computer includes characters which specify which characters of the corresponding operands are required by the computer during the execution of that particular command. The use of the improved variable field addressing system of the invention, as described above, provides for a simple and expeditious operation of the computer, and enables selected characters to be used from the different operands without the concomitant requirement of masking commands and operations, and the above described disadvantages inherent in such a requirement.

We claim:

1. In a digital computer which includes memory means for storing signals representative of a plurality of multi-character computer words, and information register means coupled to said memory means to provide a temporary storage for individual ones of said multi-character words selected from said memory means, the combination of: instruction register means for receiving and holding signals designating which multi-character word in said memory means is to be transferred to said information register means and which of the characters of the multi-character word so transferred to said information register means are to be utilized by the computer, circuitry coupled to said instruction register means and to said memory means for causing a selected multi-character word to be transferred from said memory means to said information register means, said information register means including a plurality of groups of storage units, said groups corresponding in number to the number of characters in said word and the number of storage units in each group corresponding to the number of binary bits in each such character; a plurality of "and" gates coupled to respective ones of said storage units; means for introducing bit timing pulses to said "and" gates, so that the "and" gates corresponding to each of said groups are cyclically enabled at successive bit times; a plurality of "or" gates respectively coupled to groups of said "and" gates corresponding to the aforesaid groups; a further plurality of "and" gates coupled to said "or" gates; a further "or" gate coupled to said further "and" gates; a final "and" gate coupled to said further "or" gates; first counter means coupled to said further "and" gates for enabling said further "and" gates at successive character times, second counter means for disabling said final "and" gate; and control circuitry coupled to said instruction register means and to said first and second counter means for controlling said first and second counter means in accordance with signals in said instruction register means.

2. The combination defined in claim 1 and in which said control circuitry controls the initial configuration of said first counter means in accordance with a first character in said instruction register, and in which said control circuitry controls the initial configuration of said second counter means in accordance with a second character in said instruction register.

3. The combination defined in claim 2 in which said first counter means counts up and said second counter means counts down, and in which said second counter means causes said final "and" gate to be disabled when said second counter means reaches a predetermined count.

References Cited by the Examiner

UNITED STATES PATENTS

| | | | |
|---|---|---|---|
| 2,854,652 | 9/1958 | Smith | 340—172.5 |
| 2,885,659 | 5/1959 | Spielberg | 340—172.5 |
| 2,907,002 | 9/1959 | Smith et al. | 340—172.5 |
| 2,925,588 | 2/1960 | Sublette et al. | 340—172.5 |
| 2,925,589 | 2/1960 | Schmitt | 340—172.5 |
| 2,989,731 | 6/1961 | Albanes | 340—172.5 |
| 3,064,239 | 11/1962 | Svigals et al. | 340—172.5 |

FOREIGN PATENTS

| | | |
|---|---|---|
| 764,522 | 12/1956 | Great Britain. |

OTHER REFERENCES

Pages 4–15 and 34–43, Aug. 31, 1959, publication: Honeywell 800 Programmers Reference Manual, published by Honeywell Electronic Data Processing Co.

ROBERT C. BAILEY, *Primary Examiner.*

IRVING L. SRAGOW, MALCOLM A. MORRISON, *Examiners.*

W. M. BECKER, P. J. HENON, *Assistant Examiners.*